United States Patent [19]

Bartschi

[11] Patent Number: 5,056,204
[45] Date of Patent: Oct. 15, 1991

[54] METHOD OF PRODUCING HEARING AIDS

[75] Inventor: Anton Bartschi, Antoni, Switzerland

[73] Assignee: Ascom Audiosys AG, Flamatt, Switzerland

[21] Appl. No.: 524,840

[22] Filed: May 17, 1990

[30] Foreign Application Priority Data

May 17, 1989 [CH] Switzerland ............... 01828/89

[51] Int. Cl.⁵ ............................................. H04R 25/00
[52] U.S. Cl. ........................................ 29/169.5; 29/557;
264/40.1; 364/474.05
[58] Field of Search .................. 29/109.5, 557, 848;
264/40.1, 219, 222; 434/270; 381/68, 68.6, 69,
69.2; 409/80, 84, 96; 370/348; 356/347, 359.1;
364/474.05, 474.37

[56] References Cited

U.S. PATENT DOCUMENTS

| 3,345,737 | 10/1967 | Gordon | 29/169.5 |
| 3,496,306 | 2/1970 | Pollak | 29/169.5 |
| 4,436,684 | 3/1984 | White | 265/219 |
| 4,663,720 | 5/1987 | Durett et al. | 433/214 |
| 4,735,759 | 4/1988 | Bellafiore | 381/68.6 |
| 4,800,636 | 1/1989 | Topholm | 29/169.5 |

FOREIGN PATENT DOCUMENTS 2936847  3/1981  Fed. Rep. of Germany ........ 409/84

Primary Examiner—P. W. Echols
Attorney, Agent, or Firm—Nies, Kurz, Bergert & Tamburro

[57] ABSTRACT

For hearing aids to be worn in the ear initially the measurements of the inner space of the ear are determined by a laser apparatus and the measurement are stored in a computer. The computer controls a milling cutter on which a blank consisting of plastic material into which all necessary components, such as electronic amplifier and sound transducer have been molded is shaped by means of a milling operation to provide a shape corresponding precisely to the inner space of the ear. The method eliminates the time consuming work for the production of a mold and the purchaser can obtain immediately a precisely fitting hearing aid.

6 Claims, 1 Drawing Sheet

METHOD OF PRODUCING HEARING AIDS

BACKGROUND OF THE INVENTION

1. Field of the Invention

The present invention relates to a method of producing hearing aids to be worn in the ear and including a body member adapted to the individual shape of the inner space of the ear, which body member contains an electronic amplifier and a sound transducer.

2. Description of the Prior Art

Hearing aids which are worn in the ear are customarily adapted and shaped so that their outer dimensions conform individually to the size of the ear canal of the respective user. Until now, that result was achieved by making an impression of the space of the inner ear in order to produce therewith a mold for instance of gypsum, by means of which thereafter the plastic body member or ear shell of a plastic material can be produced as exact fitting part for a respective ear canal shape. Thereafter, the electronic amplifier and the sound transducer are mounted into this ear shell, and the spatial arrangement of these components must be selected to be adjusted to the measurements of the inner space of the ear canal.

This method of production has a variety of drawbacks because the molding of the body member and the mounting of the components must be made in a special laboratory, because the hearing aid specialist skilled in the art of hearing aids usually does not possess the necessary apparatus and the know how of molding techniques. Thus the purchaser of a hearing aid cannot obtain the hearing aid immediately from the hearing aid specialist, but rather after a prolonged waiting time. Accordingly, this production method is slow and expensive and incorporates further many possible sources of error, such that the rate of rejections when trying on the finished hearing aids is relatively high.

SUMMARY OF THE INVENTION

It is, therefore, a general object of the invention to provide a method of manufacturing hearing aids which does not have the drawbacks noted above and by means of which the hearing aid specialist can produce on his own within a very short time and in a extremely precise design a body member which fits precisely the shape of the ear of a respective wearer of the hearing aid.

A further object is to provide a method of producing a hearing aid including the steps of initially taking the measurements of the inner space of the ear canal up to the eardrum for producing the individual shape of the body element, resulting from storing the data of the measurements in an electronic memory, and of controlling a milling machine by means of the stored measurement data so that the desired individual ear canal body member is milled out of a body member blank of a plastic material having an electronic amplifier and a sound transducer molded therewithin.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF PREFERRED EMBODIMENT

Figure 1:
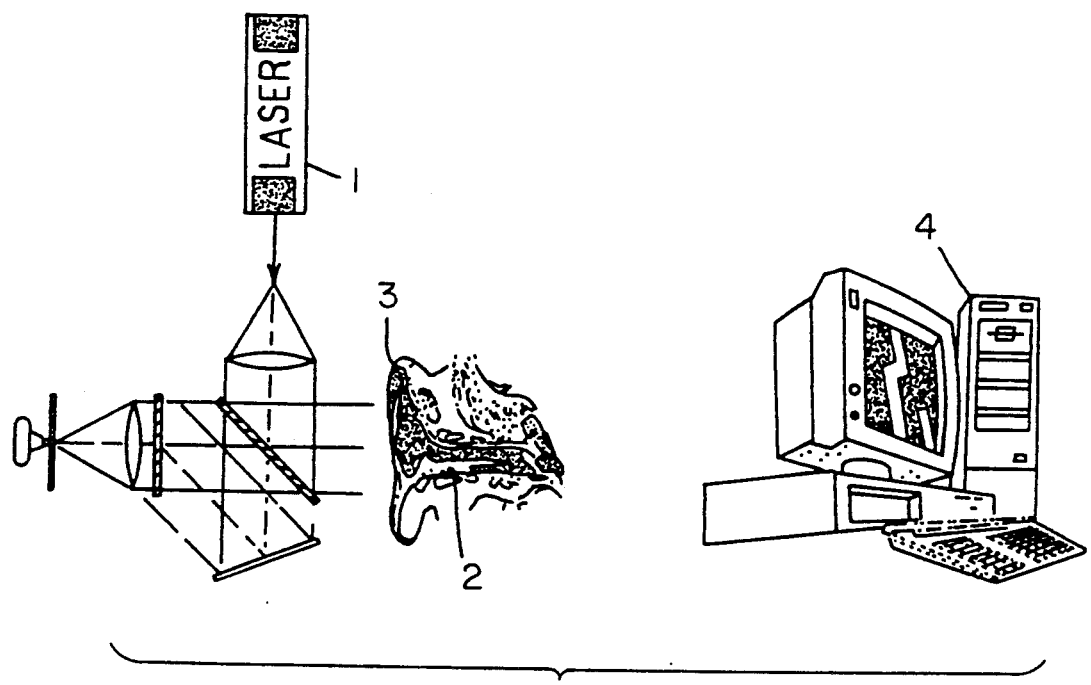
FIG. 1 illustrates the principle of taking the measurements of the inner space of the ear canal by means of a laser and of storing the measurement data in a computer.

According to FIG. 1 the measurements of the inner space 2 defining the ear canal of an ear 3 taken by means of a laser apparatus 1, or by image processing, up to the eardrum. The measurement data received are stored in an electronic memory 4, which preferably is a computer in which the data received are processed for their further use.

Figure 2:
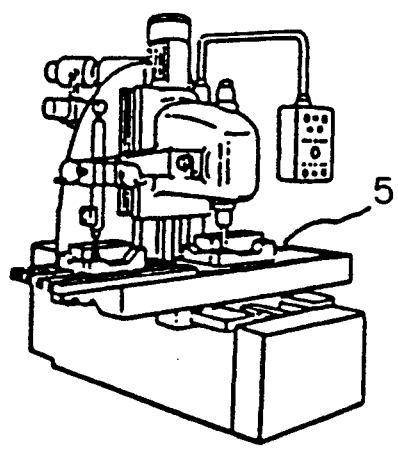
FIG. 2 illustrates a milling machine having a milling cutter controlled by the computer.
Figure 3:
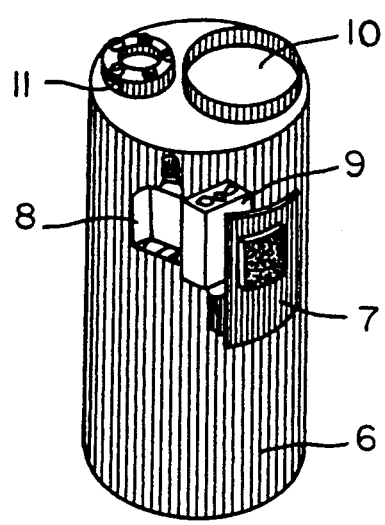
FIG. 3 illustrates a cylindrical blank for the body member or ear shell of a hearing aid on an enlarged scale and prior to the machining thereof by the milling cutter.

A milling machine 5 illustrated in FIG. 2 is controlled by the computer 4. A blank 6 of a plastic material is clamped on the table of milling machine 5, which blank is illustrated in FIG. 3 on an enlarged scale and which is machined by a milling cutter such that it is given a shape which corresponds exactly to the inner space 2 of the ear. The amplifier electronics 7, the microphone 8, the earphone 9, the battery compartment 10 and the potentiometer 11 for the volume are molded in the cylindrical plastic blank 6. Quite obviously, only the plastic material which surrounds these components can be milled of. Because a variety of shapes of the human ear exists, a selection of various blanks is produced, in which then the arrangement of these components is also varied such that at the time the blank with the most suitable arrangement of the components can be selected for the milling operation in order to obtain the respective body member. The location of these components in each of these various blanks is stored in the electronic memory for each blank such that the measurement computer selects the correct blank based upon the data of the inner space of the ear, which are also stored in the computer. In order to utilize still more skilfully the space at the blank 6 for the milling operation, the electronics 7, which comprise an amplifier as it is presently usually utilized in hearing aids, can be divided if necessary into smaller units which are interconnected by electrical conductors.

While there is shown and described a present preferred embodiment of the invention, it is to be distinctly understood that the invention is not limited thereto, but may be otherwise variously embodied and practiced within the scope of the following claims.

I claim:

1. A method of producing a hearing aid which is worn in the ear and includes an amplifier and a sound transducer built into a body member which is made to conform to the inner space of a respective ear, comprising the steps of initially taking measurements of the inner space of the ear up to the eardrum for use in producing an individual shape of the body member corresponding with the measurements of the inner space of the ear, storing the measurements in an electronic memory, providing a body member blank of plastic material and having an electronic amplifier and a sound transducer molded therewithin, and controlling a cutting operation of a cutting machine based upon the stored measurements to cut an outer surface of the body member blank to provide a desired shaped individual body member having an outer surface shape that corresponds with the ear inner space measurements.

2. The method of claim 1, in which the measurements of the inner space of the ear are taken by means of a laser apparatus.

3. The method of claim 1, in which the body member blank is substantially cylindrical and includes a microphone, an earphone, a battery compartment, a potentiometer for controlling volume, and amplifier electronics molded as components within the body member blank and the body member blank is milled on a milling machine to conform the outer surface of the body member blank with the inner ear space measurements to provide a comfortable fit when the body member is inserted into the ear and without cutting into the molded-in components, and in that a plurality of blanks of different sizes and in which electronic components are positioned interiorly in different spatial positions are produced for allowing a selection of a suitable blank, including the steps of storing in the electronic memory the positions of the components in each respective blank, and selecting a body member blank for a respective one of various shapes of ears of permitting cutting of the member blank which incorporates the most favorable interior spatial arrangement of the components to permit the removal of plastic material from a blank to conform with the ear inner space measurement without cutting into any of the components.

4. The method of claim 1 wherein the cutting machine is a milling machine.

5. The method of claim 1, including the step of selecting, before the cutting step, one body member blank from a plurality of body member blanks, wherein each body member blank includes interiorly molded electronic components, the selection based upon the ear inner space measurements and the positions of the electronic components within the blanks.

6. The method of claim 1, in which the measurements of the inner space of the ear are taken by means of image processing.

* * * * *